(12) United States Patent
Olson et al.

(10) Patent No.: US 10,788,088 B2
(45) Date of Patent: Sep. 29, 2020

(54) MULTIMODE POWERTRAINS FOR ROTORCRAFT

(71) Applicant: Bell Textron Inc., Fort Worth, TX (US)

(72) Inventors: Eric Stephen Olson, Fort Worth, TX (US); Mark Alan Przybyla, Keller, TX (US); David R. Bockmiller, Forth Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 101 days.

(21) Appl. No.: 16/274,520

(22) Filed: Feb. 13, 2019

(65) Prior Publication Data

US 2020/0248760 A1 Aug. 6, 2020

Related U.S. Application Data

(60) Provisional application No. 62/801,621, filed on Feb. 5, 2019.

(51) Int. Cl.
*F16D 41/07* (2006.01)
*B64C 27/12* (2006.01)
*F16D 1/10* (2006.01)
*B64D 35/08* (2006.01)
*F16D 121/04* (2012.01)

(52) U.S. Cl.
CPC .............. *F16D 41/07* (2013.01); *B64C 27/12* (2013.01); *B64D 35/08* (2013.01); *F16D 1/10* (2013.01);
(Continued)

(58) Field of Classification Search
CPC ........ B64D 35/00; B64D 35/08; B64C 27/12; F16D 41/00; F16D 41/07; F16D 1/10;
(Continued)

(56) References Cited

U.S. PATENT DOCUMENTS 3,362,255 A 1/1968 De et al.
3,455,182 A 7/1969 Kelley
(Continued)

OTHER PUBLICATIONS

European Search Report, Application No. 20152333.9; EPO; dated Jul. 8, 2020.

*Primary Examiner* — David R Morris
*Assistant Examiner* — Lori Wu
(74) *Attorney, Agent, or Firm* — Lawrence Youst PLLC (57) ABSTRACT

A selectable clutch assembly for a multimode powertrain of a rotorcraft. The selectable clutch assembly includes a freewheeling unit having input and output sides. The freewheeling unit has a driving mode wherein torque applied to the input side is transferred to the output side and an over running mode wherein torque applied to the output side is not transferred to the input side. A bypass assembly is coupled to and rotatable with the output side of the freewheeling unit and is actuatable between engaged and disengaged positions with the input side of the freewheeling unit. In the disengaged position, the freewheeling unit is operable in the driving and the over running modes such that the selectable clutch assembly is configured for unidirectional torque transfer. In the engaged position, the over running mode of the freewheeling unit is disabled such that the selectable clutch assembly is configured for bidirectional torque transfer.

20 Claims, 8 Drawing Sheets

(52) U.S. Cl.
CPC .... *F16D 2001/103* (2013.01); *F16D 2121/04* (2013.01)

(58) Field of Classification Search
CPC .. F16D 2001/103; F16D 25/14; F16D 25/123; F16D 2121/04
See application file for complete search history.

(56) References Cited

U.S. PATENT DOCUMENTS

| | | | |
|---|---|---|---|
| 5,271,295 A * | 12/1993 | Marnot | B64C 27/14 244/58 |
| 6,098,921 A | 8/2000 | Piasecki | |
| 8,950,700 B2 | 2/2015 | van der Westhuizen | |
| 9,580,184 B2 | 2/2017 | Bornes | |
| 10,040,566 B2 | 8/2018 | Waltner | |
| 2006/0269414 A1* | 11/2006 | Palcic | B64C 27/22 416/170 R |
| 2009/0078525 A1* | 3/2009 | Schumacher | B60B 27/00 192/69.41 |
| 2011/0048147 A1* | 3/2011 | Keech | B64C 13/341 74/89.26 |
| 2017/0327241 A1* | 11/2017 | Mitrovic | F02C 6/02 |
| 2018/0086444 A1* | 3/2018 | Poster | B64C 27/12 |
| 2018/0172088 A1 | 6/2018 | Peglowski et al. | |
| 2019/0032760 A1 | 1/2019 | Geiser et al. | |

* cited by examiner

MULTIMODE POWERTRAINS FOR ROTORCRAFT

CROSS-REFERENCE TO RELATED APPLICATIONS

The present application claims the benefit of U.S. Provisional Application No. 62/801,621, filed Feb. 5, 2019, the entire contents of which are hereby incorporated by reference.

TECHNICAL FIELD OF THE DISCLOSURE

The present disclosure relates, in general, to powertrains operable for use on rotorcraft and, in particular, to multimode powertrains operable to selectively utilize secondary engine power independent of or together with main engine power to drive the main rotor, the tail rotor and/or the accessories of a rotorcraft.

BACKGROUND

Certain rotorcraft are capable of taking off, hovering and landing vertically. One such rotorcraft is a helicopter, which has one or more main rotors that provide lift and thrust to the aircraft. The main rotors not only enable hovering and vertical takeoff and landing, but also enable forward, backward and lateral flight. These attributes make helicopters highly versatile for use in congested, isolated or remote areas. Another such rotorcraft is a tiltrotor aircraft, which has a set of proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

The power demand of a rotorcraft can change significantly based upon the operating mode of the rotorcraft. For example, significantly more power may be demanded during takeoff, hover or dash operations compared to cruise or preflight operations. Certain rotorcraft utilize auxiliary power units to supply preflight power during startup procedures and to start the main engine of the rotorcraft. It has been found, however, that these auxiliary power units are not operable to provide supplemental power or emergency power to the main rotor during flight operation.

SUMMARY

In a first aspect, the present disclosure is directed to a selectable clutch assembly that includes a freewheeling unit having an input side and an output side. The freewheeling unit has a driving mode wherein torque applied to the input side is transferred to the output side and an over running mode wherein torque applied to the output side is not transferred to the input side. A bypass assembly is coupled to the output side of the freewheeling unit and is rotatable therewith. The bypass assembly is actuatable between an engaged position and a disengaged position with the input side of the freewheeling unit. In the disengaged position, the freewheeling unit is operable in the driving mode and the over running mode such that the selectable clutch assembly is configured for unidirectional torque transfer from the input side to the output side. In the engaged position, the over running mode of the freewheeling unit is disabled such that the selectable clutch assembly is configured for bidirectional torque transfer from the input side to the output side and from the output side to the input side.

In some embodiments, the freewheeling unit may be a sprag clutch. In certain embodiments, the bypass assembly may include a bypass coupling that is coupled to the output side of the freewheeling unit at a splined connection. In such embodiments, the bypass coupling may be coupled to the input side of the freewheeling unit at a splined connection when the bypass assembly is in the engaged position. Alternatively, the bypass coupling may be coupled to the input side of the freewheeling unit at a ratchet connection when the bypass assembly is in the engaged position. In some embodiments, the bypass assembly may include an actuator configured to shift the bypass assembly between the engaged position and the disengaged position. In certain embodiments, the bypass assembly may include a locking assembly configured to maintain the bypass assembly in the engaged position and in the disengaged position.

In a second aspect, the present disclosure is directed to a multimode powertrain for a rotorcraft. The multimode powertrain includes a main drive system, a secondary drive system and a selectable clutch assembly positioned between the main and the secondary drive systems. The selectable clutch assembly includes a freewheeling unit having an input side coupled to the main drive system and an output side coupled to the secondary drive system. The freewheeling unit has a driving mode wherein torque applied to the input side is transferred to the output side and an over running mode wherein torque applied to the output side is not transferred to the input side. A bypass assembly is coupled to the output side of the freewheeling unit and is rotatable therewith. The bypass assembly is actuatable between an engaged position and a disengaged position with the input side of the freewheeling unit. In the disengaged position, the freewheeling unit is operable in the driving mode and the over running mode such that the selectable clutch assembly is configured for unidirectional torque transfer from the input side to the output side. In the engaged position, the over running mode of the freewheeling unit is disabled such that the selectable clutch assembly is configured for bidirectional torque transfer from the input side to the output side and from the output side to the input side.

In some embodiments, the main drive system may include a main engine, a main rotor gearbox coupled to the main engine and a tail rotor gearbox coupled to the main rotor gearbox and the secondary drive system may include a secondary engine. In a preflight configuration, the selectable clutch assembly is in the disengaged position, the main engine is not operating and the secondary engine provides power to at least one rotorcraft accessory coupled to the secondary drive system. In an enhanced power configuration, the selectable clutch assembly is in the engaged position, the main engine provides power to the main rotor gearbox and the tail rotor gearbox and the secondary engine provides power to at least one rotorcraft accessory coupled to the secondary drive system and to the main drive system through the selectable clutch assembly. In a high efficiency configuration, the selectable clutch assembly is in the engaged position, the secondary engine is not operating, the main engine provides power to the main rotor gearbox, the tail rotor gearbox and the secondary drive system through the selectable clutch assembly to power at least one rotorcraft accessory coupled to the secondary drive system. In an enhanced autorotation configuration, the selectable clutch assembly is in the engaged position, the main engine is not operating and the secondary engine provides power to the main drive system through the selectable clutch assembly including to the main rotor gearbox. In certain embodiments, the secondary engine may be configured to generate between about 5 percent and about 20 percent of the horsepower of the main engine. In other embodiments, the secondary engine may be configured to generate between about 10 percent and about 15 percent of the horsepower of the main engine.

In a third aspect, the present disclosure is directed to a rotorcraft that includes a main drive system having a main engine, a main rotor gearbox coupled to the main engine and a tail rotor gearbox coupled to the main rotor gearbox. A main rotor is coupled to the main rotor gearbox and is rotatable thereby. A tail rotor is coupled to the tail rotor gearbox and is rotatable thereby. A secondary drive system includes a secondary engine. A selectable clutch assembly is positioned between the main and the secondary drive systems. The selectable clutch assembly includes a freewheeling unit having an input side coupled to the main drive system and an output side coupled to the secondary drive system. The freewheeling unit has a driving mode wherein torque applied to the input side is transferred to the output side and an over running mode wherein torque applied to the output side is not transferred to the input side. A bypass assembly is coupled to the output side of the freewheeling unit and is rotatable therewith. The bypass assembly is actuatable between an engaged position and a disengaged position with the input side of the freewheeling unit. In the disengaged position, the freewheeling unit is operable in the driving mode and the over running mode such that the selectable clutch assembly is configured for unidirectional torque transfer from the input side to the output side. In the engaged position, the over running mode of the freewheeling unit is disabled such that the selectable clutch assembly is configured for bidirectional torque transfer from the input side to the output side and from the output side to the input side.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
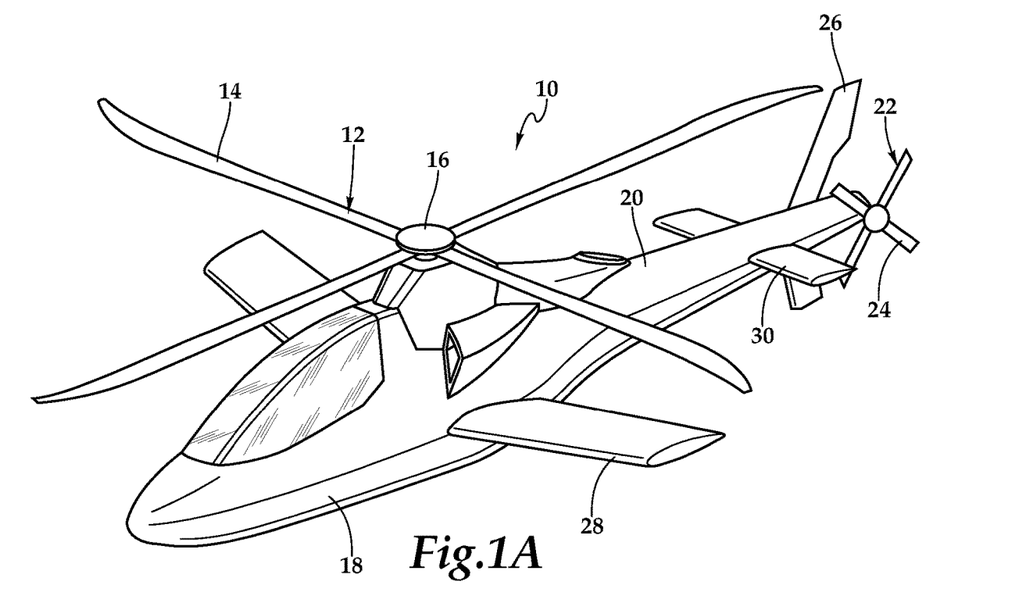
FIGS. 1A-1C are schematic illustrations of a rotorcraft having a multimode powertrain in accordance with embodiments of the present disclosure.
Figure 1B:
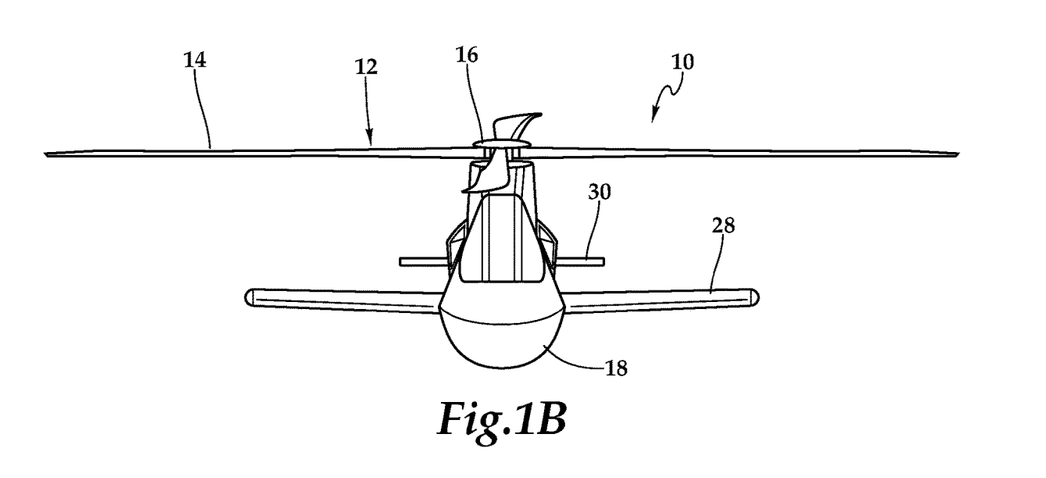
Figure 1C:
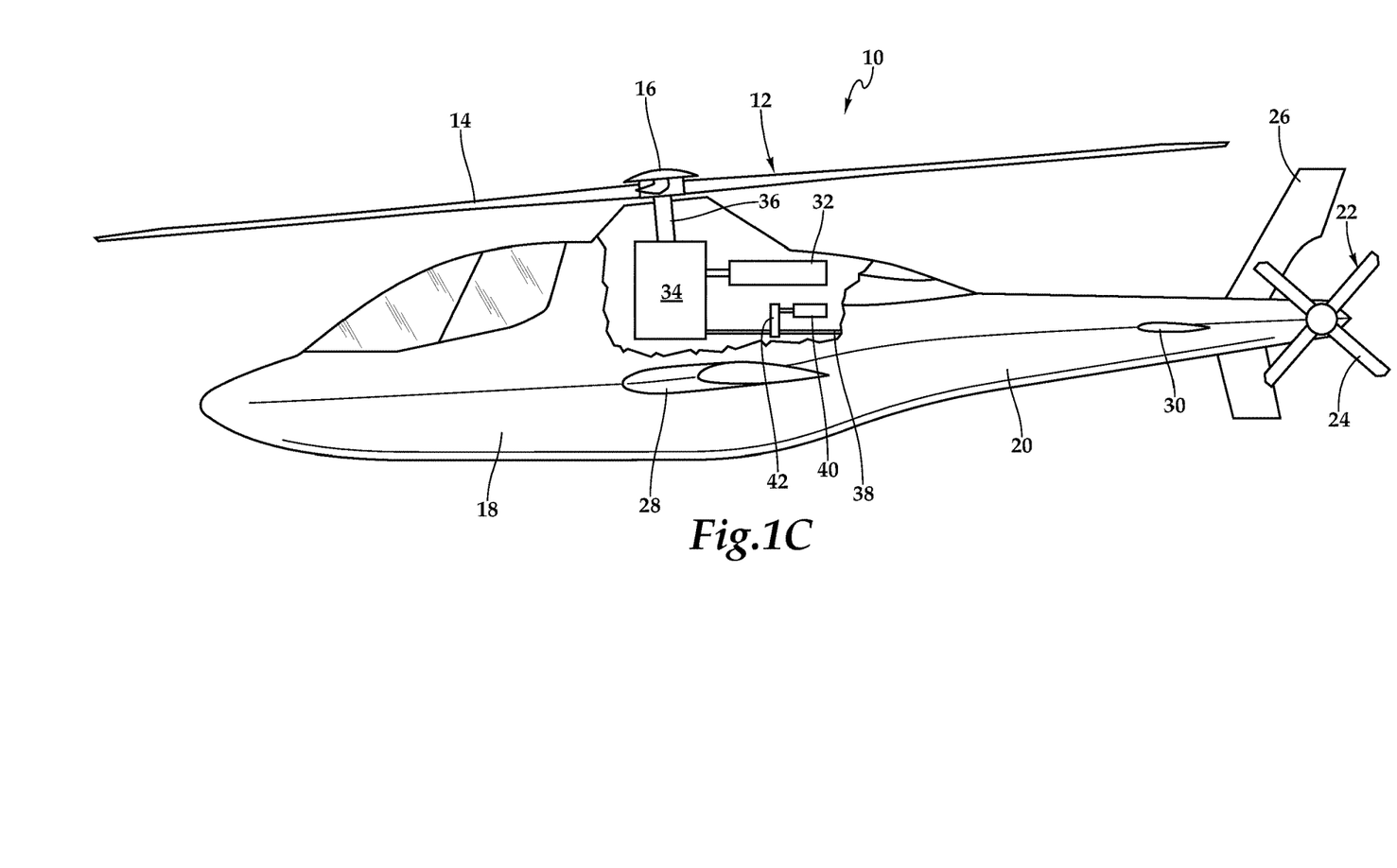

Referring to FIGS. 1A-1C in the drawings, a rotorcraft in the form of a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust and lift of helicopter 10. A tailboom 20 is coupled to fuselage 18 and extends from fuselage 18 in the aft direction. An anti-torque system 22 includes a tail rotor assembly 24 coupled to an aft end of tailboom 20. Anti-torque system 22 controls the yaw of helicopter 10 by counteracting the torque exerted on fuselage 18 by main rotor assembly 12. In the illustrated embodiment, helicopter 10 includes a vertical tail fin 26 that provide stabilization to helicopter 10 during high speed forward flight. In addition, helicopter 10 includes wing members 28 that extend laterally from fuselage 18 and wing members 30 that extend laterally from tailboom 20. Wing members 28, 30 provide lift to helicopter 10 responsive to the forward airspeed of helicopter 10, thereby reducing the lift requirement on main rotor assembly 12 and increasing the top speed of helicopter 10

Main rotor assembly 12 and tail rotor assembly 24 receive torque and rotational energy from a main engine 32. Main engine 32 is coupled to a main rotor gearbox 34 by suitable clutching and shafting. Main rotor gearbox 34 is coupled to main rotor assembly 12 by a mast 36 and is coupled to tail rotor assembly 24 by tail rotor drive shaft 38. In the illustrated embodiment, a secondary engine 40 is coupled to tail rotor drive shaft 38 by a secondary engine gearbox 42 that provides suitable clutching therebetween. Together, main engine 40, main rotor gearbox 34, tail rotor drive shaft 38, secondary engine 40 and secondary engine gearbox 42 as well as the various other shafts and gearboxes coupled therein may be considered as the multimode powertrain of helicopter 10.

Secondary engine 40 is operable as an auxiliary power unit to provide preflight power to the accessories of helicopter 10 such as electric generators, hydraulic pumps and the like as well as to provide the power required to start main engine 32. In addition, secondary engine 40 is operable to provide supplemental power that is additive with the power provided by main engine 32 during, for example, high power demand conditions including takeoff, hover and dash operations. Secondary engine 40 is also operable to provide emergency power to main rotor assembly 12. For example, in the event of a failure of main engine 32, secondary engine 40 is operable to provide emergency power to enhance the autorotation and flare recovery maneuver of helicopter 10. Use of secondary engine 40 not only enhances the safety of helicopter 10 but also increases the efficiency of helicopter 10. For example, having the extra power provided by secondary engine 40 during high power demand operations allows main engine 32 to be downsized for more efficient single engine operations such as during cruise operations.

It should be appreciated that helicopter 10 is merely illustrative of a variety of aircraft that can implement the embodiments disclosed herein. Indeed, the multimode powertrain of the present disclosure may be implemented on any rotorcraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones and the like. As such, those skilled in the art will recognize that the multimode powertrain of the present disclosure can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2A-2D in the drawings, various operating configurations of a multimode powertrain 100 for a rotorcraft are illustrated in a block diagram format. Multimode powertrain 100 includes a main engine 102 such as a turbo shaft engine capable of producing 2000 to 4000 horsepower or more, depending upon the particular implementation. Main engine 102 is coupled to a freewheeling unit depicted as sprag clutch 104 that acts as a one-way clutch enabling a driving mode wherein torque from main engine 102 is coupled to main rotor gearbox 106 when the input side rotating speed to sprag clutch 104 is matched with the output side rotating speed from sprag clutch 104. For convenience of illustration, the input side of sprag clutch 104 is depicted as the apex of the greater than symbol and the output side of sprag clutch 104 is depicted as the open end of the greater than symbol. Importantly, sprag clutch 104 has an over running mode wherein main engine 102 is decoupled from main rotor gearbox 106 when the input side rotating speed of sprag clutch 104 is less than the output side rotating speed of sprag clutch 104. Operating sprag clutch 104 in the over running mode allows, for example, main rotor 108 of helicopter 10 to engage in autorotation in the event of a failure of main engine 102.

In the illustrated embodiment, main rotor gearbox 106 is coupled to sprag clutch 104 via a suitable drive shaft. In addition, main rotor gearbox 106 is coupled to main rotor 108 by a suitable mast. Main rotor gearbox 106 includes a gearbox housing and a plurality of gears, such as planetary gears, used to adjust the engine output to a suitable rotational speed so that main engine 102 and main rotor 108 may each rotate at optimum speed during flight operations of helicopter 10. Main rotor gearbox 106 is coupled to a tail rotor gearbox 110 via a suitable tail rotor drive shaft. Tail rotor gearbox 110 includes a gearbox housing and a plurality of gears that may adjust the main rotor gearbox output to a suitable rotational speed for operation of tail rotor 112. Main engine 102, sprag clutch 104, main rotor gearbox 106 and tail rotor gearbox 110 as well as the various shafts and gearing systems coupled therewith may be considered the main drive system of multimode powertrain 100.

Multimode powertrain 100 includes a secondary engine 114 such as a turbo shaft engine capable of producing 200 to 400 horsepower or more, depending upon the particular implementation. In the illustrated embodiment, secondary engine 114 may generate between about 5 percent and about 20 percent of the horsepower of main engine 102. In other embodiments, secondary engine 114 may generate between about 10 percent and about 15 percent of the horsepower of main engine 102. Secondary engine 114 is coupled to a freewheeling unit depicted as sprag clutch 116 that acts as a one-way clutch enabling a driving mode wherein torque from secondary engine 114 is coupled through sprag clutch 116 from the input side to the output side. Importantly, sprag clutch 116 has an over running mode wherein secondary engine 114 is decoupled from torque transfer with sprag clutch 116 when the input side rotating speed of sprag clutch 116 is less than the output side rotating speed of sprag clutch 116. Operating sprag clutch 116 in the over running mode allows, for example, main engine 102 to drive the rotorcraft accessories such as one or more generators 118, one or more hydraulic pumps 120 or other accessories 122 when secondary engine 114 is not operating, as discussed herein. Secondary engine 114 and sprag clutch 116 as well as the various shafts and gearing systems coupled therewith may be considered the secondary drive system of multimode powertrain 100.

Disposed between the main drive system and the secondary drive system of multimode powertrain 100 is a selectable clutch assembly 124 that has a unidirectional torque transfer mode and a bidirectional torque transfer mode. In the unidirectional torque transfer mode of selectable clutch assembly 124, torque can be driven from the main drive system to the secondary drive system of multimode powertrain 100 but torque cannot be driven from the secondary drive system to the main drive system of multimode powertrain 100. In the bidirectional torque transfer mode of selectable clutch assembly 124, torque can be driven from the main drive system to the secondary drive system of multimode powertrain 100 and torque can be driven from the secondary drive system to the main drive system of multimode powertrain 100. In the illustrated embodiment, selectable clutch assembly 124 includes a freewheeling unit depicted as sprag clutch 126 and a bypass assembly 128. Sprag clutch 126 acts as a one-way clutch enabling a driving mode wherein torque from the main drive system is coupled through sprag clutch 126 from the input side to the output side. Sprag clutch 126 also has an over running mode wherein the main drive system is decoupled from torque transfer with sprag clutch 126 when the input side rotating speed of sprag clutch 126 is less than the output side rotating speed of sprag clutch 126. When the over running mode of sprag clutch 126 is enabled, selectable clutch assembly 124 is in its unidirectional torque transfer mode. The over running mode of selectable clutch assembly 124 can be disabled by engaging bypass assembly 128 with sprag clutch 126. When bypass assembly 128 prevents sprag clutch 126 from operating in the over running mode, selectable clutch assembly 124 is in its bidirectional torque transfer mode.

Figure 2A:
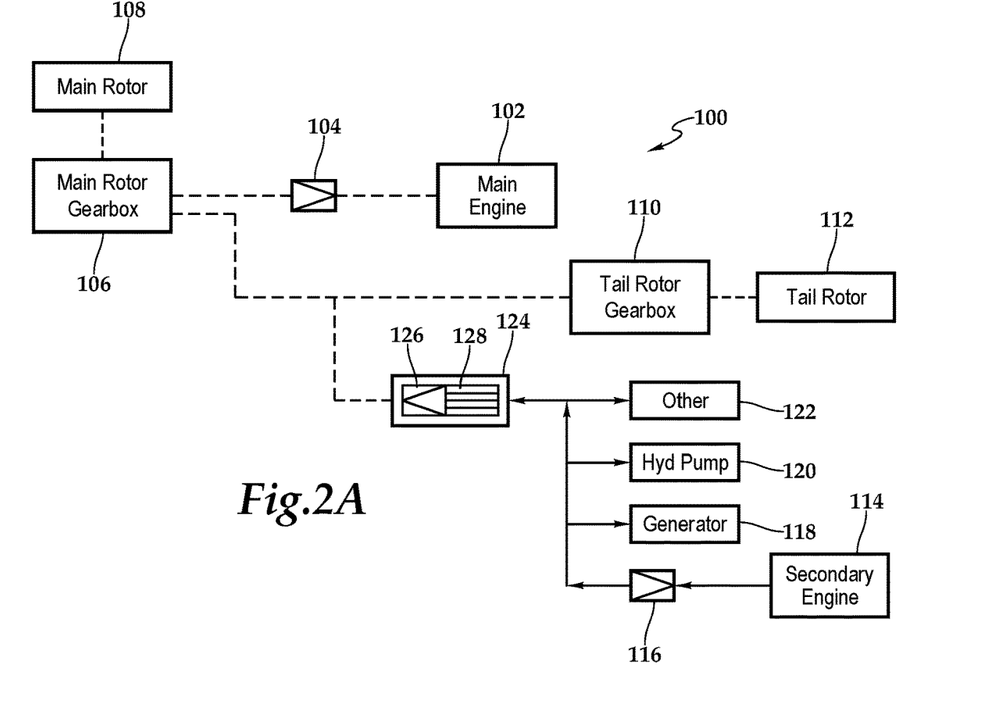
FIGS. 2A-2D are block diagrams of a multimode powertrain for a rotorcraft in various operating configurations in accordance with embodiments of the present disclosure.

In FIG. 2A, multimode powertrain 100 is in a preflight configuration in which main engine 102 is not yet operating as indicated by the dashed lines between the components of the main drive system. As the main drive system is not turning, no torque is being applied to selectable clutch assembly 124 as indicated by the dashed lines therebetween. In addition, selectable clutch assembly 124 is in the unidirectional torque transfer mode wherein bypass assembly 128 is disengaged from sprag clutch 126. In the preflight configuration, secondary engine 114 is operating and providing torque and rotational energy within the secondary drive system, as indicated by the solid lines and arrowheads. More specifically, secondary engine 114 is driving the input side of sprag clutch 116, which causes the output side of sprag clutch 116 to drive an output shaft and/or output gear system. The output torque from sprag clutch 116 is used to drive the rotorcraft accessories such as one or more generators 118, one or more hydraulic pumps 120 as well as other accessories 122. While operating in the preflight configuration, the pilot of helicopter 10 can proceed through the startup procedure and can use power from secondary engine 114 to start main engine 102.

Figure 2B:
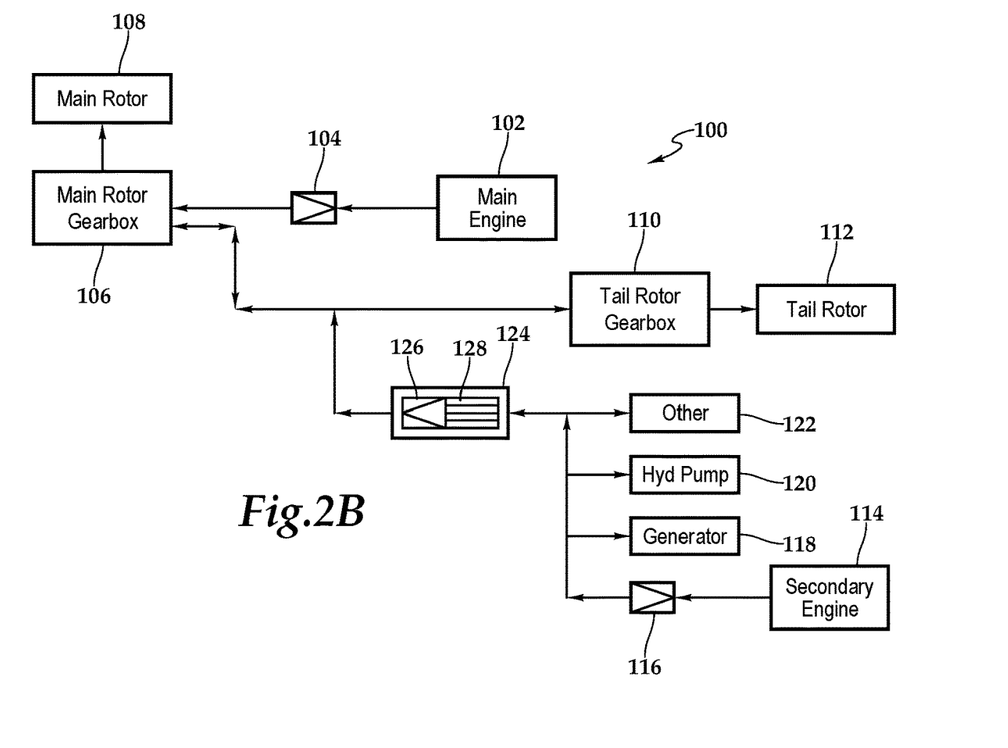

Once main engine 102 is operating, torque is delivered through the main drive system as indicated by the solid lines and arrowheads between the components within the main drive system, as best seen in FIG. 2B. In addition, as the main drive system is turning, torque may be applied to selectable clutch assembly 124. As discussed herein, in order to shift selectable clutch assembly 124 from the unidirectional torque transfer mode to the bidirectional torque transfer mode, power should be applied to the input side of sprag clutch 126 from the main drive system such that the input side and the output side of sprag clutch 126 are turning together. Bypass assembly 128 can now be actuated from the disengaged position to the engaged position placing selectable clutch assembly 124 in the bidirectional torque transfer mode. The operations of engaging and disengaging bypass assembly 128 may be pilot controlled and/or may be automated by the flight control computer of helicopter 10 and may determined according to the operating conditions of helicopter 10. In this configuration, power from secondary engine 114 may not only drive the rotorcraft accessories but may also be used to augment the power of main engine 102 within the main drive system, as indicated by the solid lines and arrowhead from selectable clutch assembly 124 to the main drive system in FIG. 2B. This configuration may be referred to as the enhanced power configuration of multimode powertrain 100 wherein main engine 102 and secondary engine 114 are operating together and selectable clutch assembly 124 is in the bidirectional torque transfer mode. The enhanced power configuration of multimode powertrain 100 is particularly useful during high power demand operations such as during takeoff, hover or dash operations.

Figure 2C:
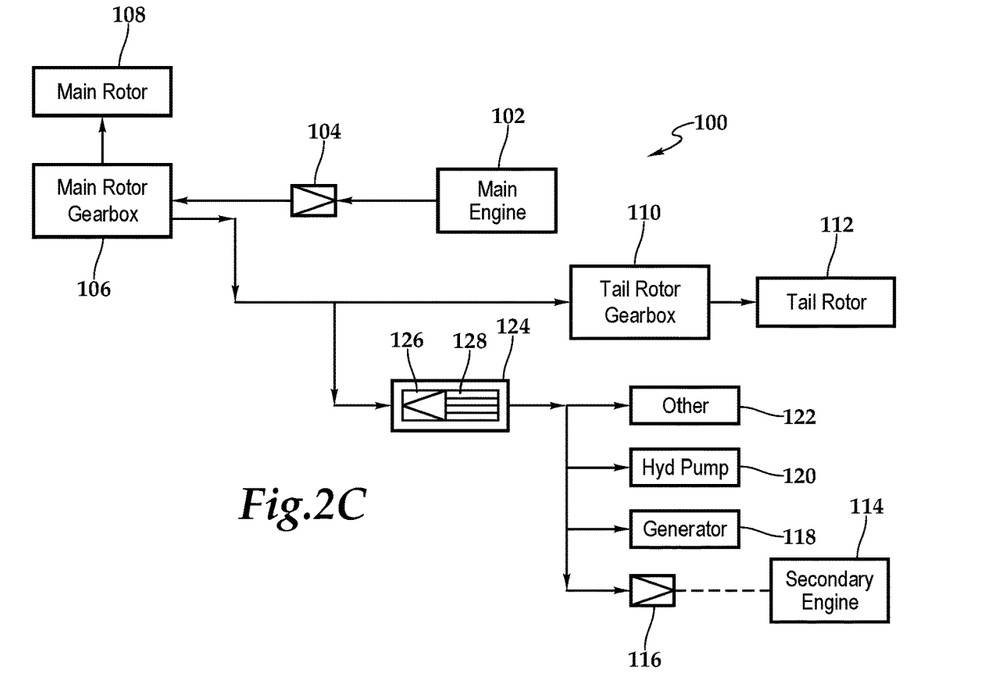

Once helicopter 10 has completed a takeoff, it may be desirable to shut down secondary engine 114 and operate helicopter 10 in the high efficiency configuration of multimode powertrain 100, as best seen in FIG. 2C. In this configuration, secondary engine 114 is shut down as indicated by the dashed line between secondary engine 114 and sprag clutch 116. Also, in this configuration, torque and rotational energy are transferred from main engine 102 through the main drive system to selectable clutch assembly 124, as indicated by the solid lines and arrowhead therebetween. The input power is transferred through selectable clutch assembly 124 and is output to drive the rotorcraft accessories such as one or more generators 118, one or more hydraulic pumps 120 as well as other accessories 122. It is noted that rotational energy is also sent to sprag clutch 116, which is operating in its over running mode while secondary engine 114 is not operating. Thus, in addition to powering main rotor 108 and tail rotor 112, in the high efficiency configuration of multimode powertrain 100, main engine 102 also powers all of the accessories of helicopter 10. It should be noted that selectable clutch assembly 124 is preferably maintained in its bidirectional torque transfer mode during all flight operations. Selectable clutch assembly 124, however, is a fail safe component in that even if selectable clutch assembly 124 is shifted to the disengaged position and thus the unidirectional torque transfer mode, main engine 102 still drives torque and rotation energy through selectable clutch assembly 124 to operate the rotorcraft accessories.

Figure 2D:
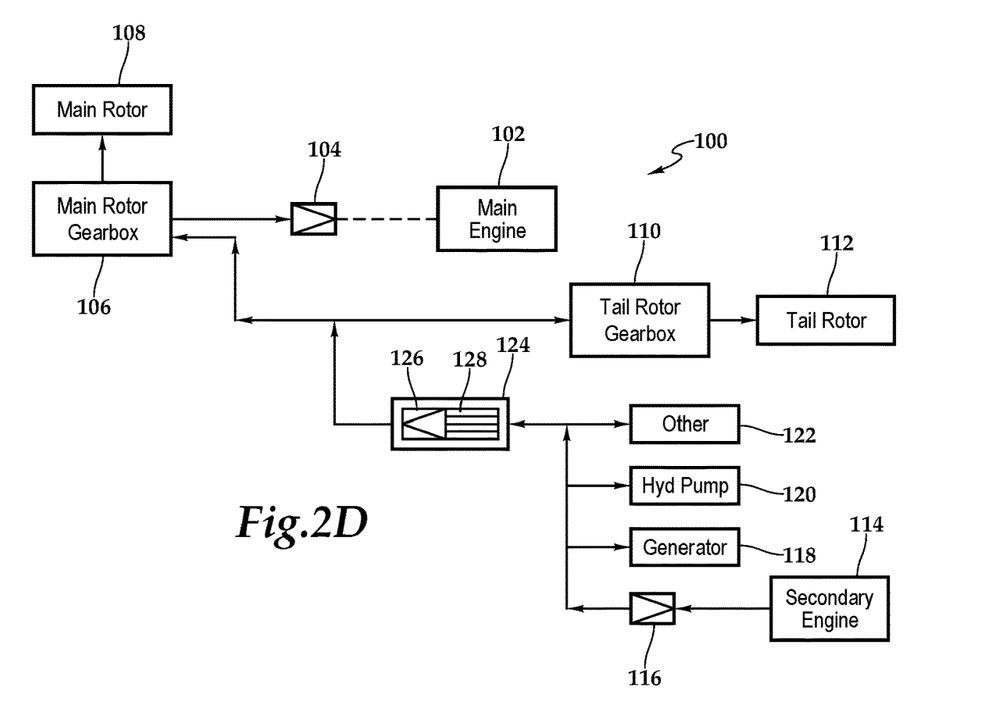

In addition, it is preferred that selectable clutch assembly 124 be maintained in its bidirectional torque transfer mode as a safety feature in the event of a failure in main engine 102 during flight, as indicated by the dashed lines between main engine 102 and sprag clutch 104 in FIG. 2D. In this case, an autorotation maneuver may be performed in which the descent rate of helicopter 10 is reduced using the aerodynamic force of the air moving up through main rotor 108. Upon final approach during the autorotation landing, helicopter 10 then performs a flare recovery maneuver in which the kinetic energy of main rotor 108 is converted into lift using aft cyclic control. Both the autorotation maneuver and the flare recovery maneuver are enhanced by operating secondary engine 114 and sending power through selectable clutch assembly 124 to the main drive system, as indicated by the solid lines and arrowhead therebetween, and more particularly by sending power to main rotor 108 as indicated by the solid lines and arrowheads leading thereto. It is noted that rotational energy is also sent to sprag clutch 104, which is operating in its over running mode while main engine 102 is not operating. This configuration may be referred to as the enhanced autorotation configuration of multimode powertrain 100 wherein main engine 102 is down but secondary engine 114 is providing power to main rotor 108 through selectable clutch assembly 124, which is in the bidirectional torque transfer mode.

Figure 3A:
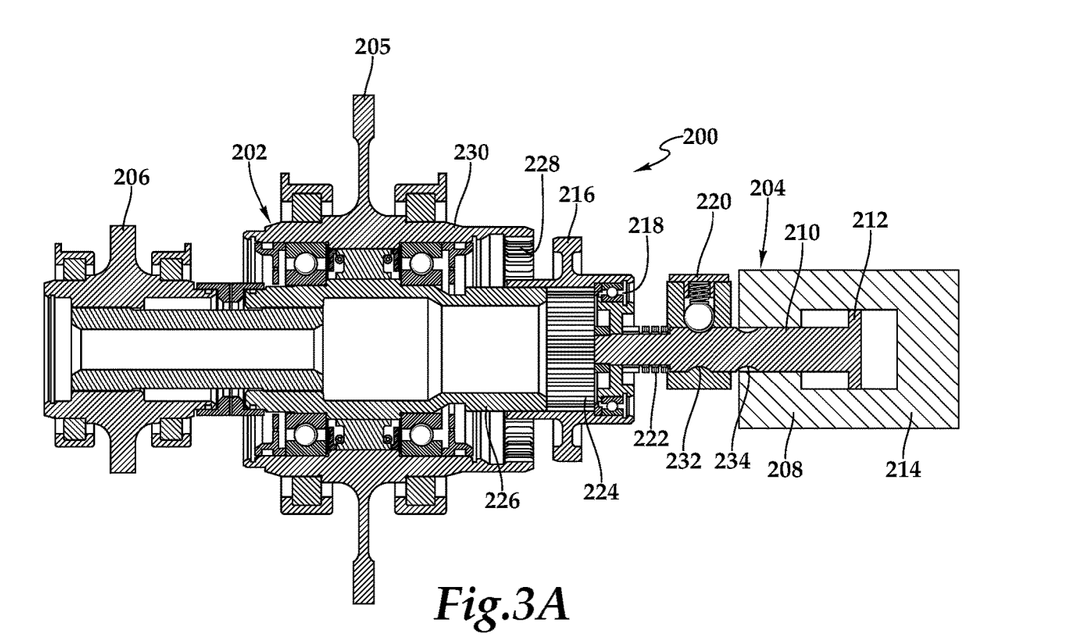
FIGS. 3A-3B are schematic illustrations of a selectable clutch assembly for use in a multimode powertrain of a rotorcraft in disengaged and engaged positions in accordance with embodiments of the present disclosure.
Figure 3B:
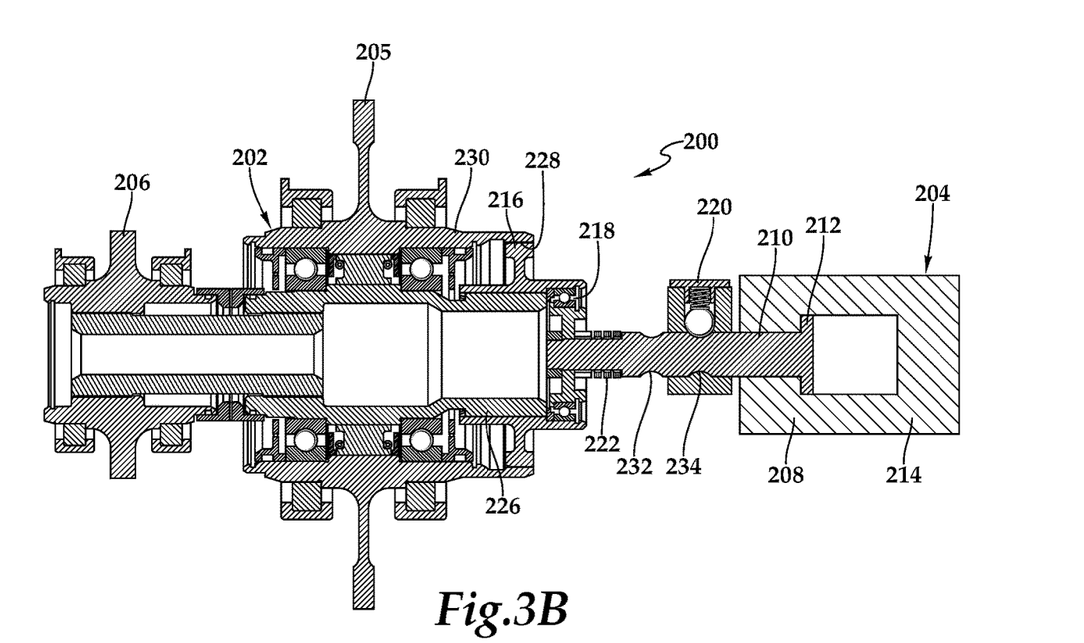

Referring to FIGS. 3A-3B in the drawings, a selectable clutch assembly is schematically illustrated and generally designated 200. Selectable clutch assembly 200 includes a freewheeling unit depicted as sprag clutch 202 and a bypass assembly 204. As discussed herein, selectable clutch assembly 200 has a unidirectional torque transfer mode and a bidirectional torque transfer mode. In the unidirectional torque transfer mode, torque can be driven from the input of side sprag clutch 202, including input gear 205, to the output side of sprag clutch 202, including output gear 206, but torque cannot be driven from output gear 206 to input gear 205. In the bidirectional torque transfer mode, torque can be driven from input gear 205 to output gear 206 and torque can be driven from output gear 206 to input gear 205. For example, in the unidirectional torque transfer mode, selectable clutch assembly 200 operates with the functionality of sprag clutch 202 wherein torque and rotational energy from the main drive system of helicopter 10, which is coupled to input gear 205, is operable to drive the secondary drive system of helicopter 10, which is coupled to output gear 206. Torque and rotational energy from the secondary drive system of helicopter 10, however, is not operable to drive the main drive system of helicopter 10 as sprag clutch 202 will be operating in its over running mode. As another example, in the bidirectional torque transfer mode, selectable clutch assembly 200 operates with the functionality of a connected shaft wherein torque and rotational energy from the main drive system of helicopter 10 is operable to drive the secondary drive system of helicopter 10 and torque and rotational energy from the secondary drive system of helicopter 10 is operable to drive the main drive system of helicopter 10.

Selectable clutch assembly 200 is operated between the unidirectional and bidirectional torque transfer modes by actuating bypass assembly 204 between its disengaged and engaged positions. In the illustrated embodiment, bypass assembly 204 includes an actuator depicted as hydraulic actuator 208. In other embodiments, the actuator of bypass assembly 204 could be an electrical actuator, a mechanical actuator or other suitable actuation device. Hydraulic actuator 208 includes an actuation shaft 210 that is movable between first and second positions responsive to hydraulic pressure operating on a piston end 212 of actuation shaft 210, which is disposed within a hydraulic cylinder 214 of hydraulic actuator 208. Actuation shaft 210 is coupled to bypass coupling 216 at bearing assembly 218 that provides for relative rotation therebetween. In the illustrated embodiment, bypass assembly 204 includes a mechanical locking assembly depicted as ball-detent locking mechanism 220. A biasing element depicted as wave spring 222 is positioned between actuation shaft 210 and bearing assembly 218.

In FIG. 3A, selectable clutch assembly 200 is in the unidirectional torque transfer mode wherein bypass assembly 204 is in the disengaged position. As illustrated, inner splines 224 of bypass coupling 216 are in mesh with outer splines (not visible) of inner shaft 226 of the output side of sprag clutch 202. As such, when the output side of sprag clutch 202 is rotating, bypass coupling 216 also rotates. Outer splines (not visible) of bypass coupling 216 are out of mesh with inner splines 228 of outer race 230 of the input side of sprag clutch 202. As such, bypass coupling 216 may rotate independent of the input side of sprag clutch 202 when sprag clutch 202 is operating in its over running mode. In this disengaged position, actuation shaft 210 is in its first position relative to hydraulic cylinder 214 and is secured in the first position by ball-detent locking mechanism 220 as one or more balls are engaged with a first detent groove 232 of actuation shaft 210.

When it is desired to operate selectable clutch assembly 200 from the unidirectional to the bidirectional torque transfer mode, the input side of sprag clutch 202 is used to drive the output side of sprag clutch 202 such that bypass coupling 216 and outer race 230 will be rotating at the same speed. Hydraulic pressure may then be used to bias actuation shaft 210 toward sprag clutch 202. When the force on piston end 212 is sufficient to overcome the locking force generated by ball-detent locking mechanism 220, actuation shaft 210 will shift toward sprag clutch 202 causing the outer splines of bypass coupling 216 to mesh with inner splines 228 of outer race 230, thereby shifting bypass assembly 204 to the engaged position and selectable clutch assembly 200 to the bidirectional torque transfer mode, as best seen in FIG. 3B. Wave spring 222 assists in overcoming any misalignment in the clocking of the outer splines of bypass coupling 216 and inner splines 228 of outer race 230 by allowing full actuation of actuation shaft 210 while maintaining pressure between bypass coupling 216 and outer race 230 so that when inner shaft 226 and outer race 230 start to rotate relative to each other, outer splines of bypass coupling 216 will mesh with inner splines 228 of outer race 230. Once bypass assembly 204 is in the engaged position, actuation shaft 210 is in its second position relative to hydraulic cylinder 214 and is secured in the second position by ball-detent locking mechanism 220 as one or more balls are engaged with a second detent groove 234 of actuation shaft 210. In this bidirectional torque transfer mode of selectable clutch assembly 200, when the output side of sprag clutch 202 is rotating, bypass coupling 216 rotates therewith. Likewise, when the input side of sprag clutch 202 is rotating, bypass coupling 216 rotates therewith, thereby bypassing the over running mode of sprag clutch 202 such that selectable clutch assembly 200 operates with the functionality of a connected shaft.

When it is desired to operate selectable clutch assembly 200 from the bidirectional to the unidirectional torque transfer mode, the input side of sprag clutch 202 preferably drives the output side of sprag clutch 202. Hydraulic pressure may then be used to bias actuation shaft 210 away from sprag clutch 202. When the force on piston end 212 is sufficient to overcome the locking force generated by ball-detent locking mechanism 220, actuation shaft 210 will shift away from sprag clutch 202 causing the outer splines of bypass coupling 216 shift out of mesh with inner splines 228 of outer race 230, thereby shifting bypass assembly 204 to the disengaged position and selectable clutch assembly 200 to the unidirectional torque transfer mode, as best seen in FIG. 3A. Once bypass assembly 204 is in the disengaged position, actuation shaft 210 has returned to its first position relative to hydraulic cylinder 214 and is secured in the first position by ball-detent locking mechanism 220 as one or more balls are engaged with first detent groove 232 of actuation shaft 210.

Figure 4A:
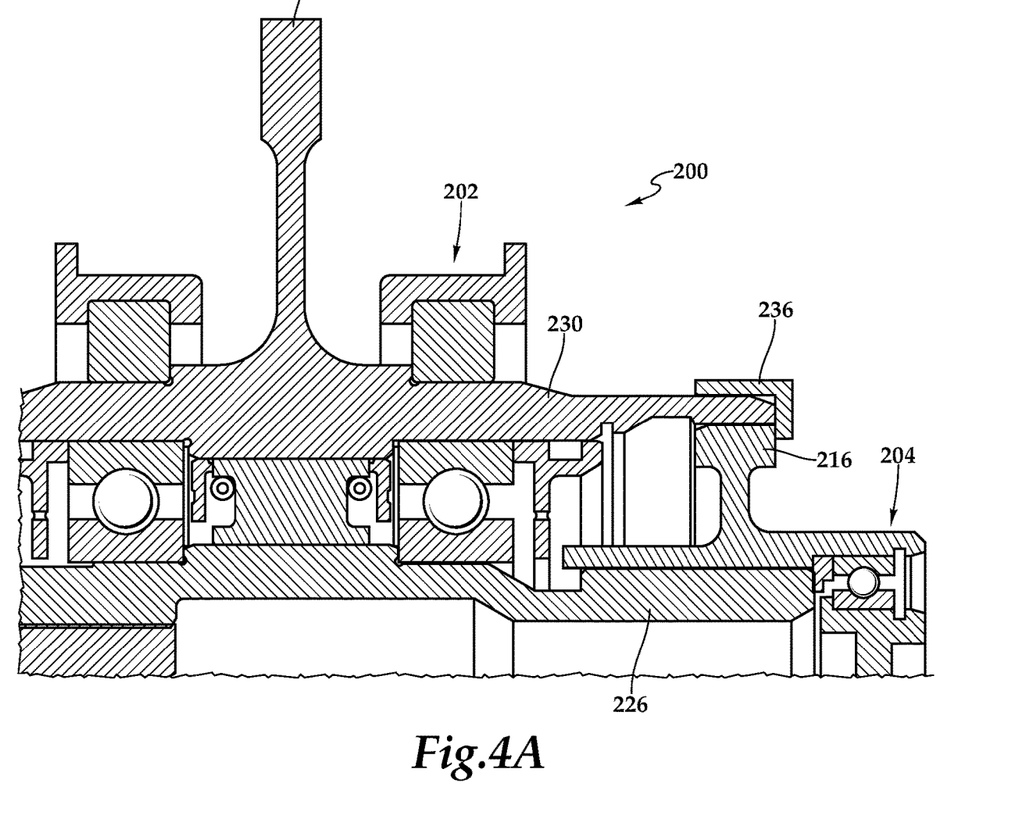
FIGS. 4A-4B are schematic illustrations of a blocking ring operable to aid in the actuation of a selectable clutch assembly from the disengaged position to the engaged position in accordance with embodiments of the present disclosure.
Figure 4B:
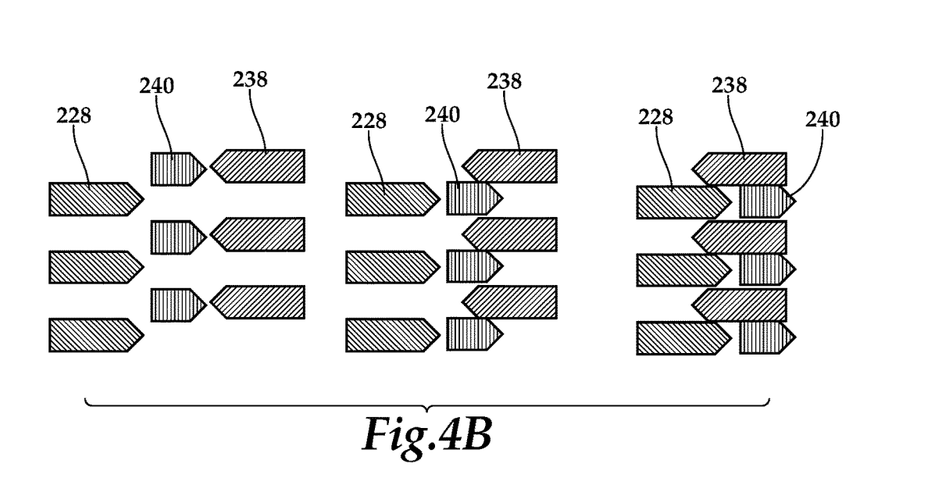

Referring to FIGS. 4A-4B in the drawings, selectable clutch assembly 200 is shown with an optional feature of a blocking ring 236 used instead of wave spring 222 to overcome misalignment in the clocking of outer splines 238 of bypass coupling 216 and inner splines 228 of outer race 230. In the illustrated embodiment, blocking ring 236 enhances the engagement sequence by providing alignment functionality between outer splines 238 of bypass coupling 216 and inner splines 228 of outer race 230. As best seen in the progression depicted in FIG. 4B, blocking ring 236 includes splines 240 the are positioned between outer splines 238 of bypass coupling 216 and inner splines 228 of outer race 230 as bypass coupling 216 moves toward outer race 230. Preferably, blocking ring 236 is allowed to rotate slightly in one direction relative to outer race 230 but not in the other direction, which aids in aligning outer splines 238 of bypass coupling 216 with inner splines 228 of outer race 230.

Figure 5A:
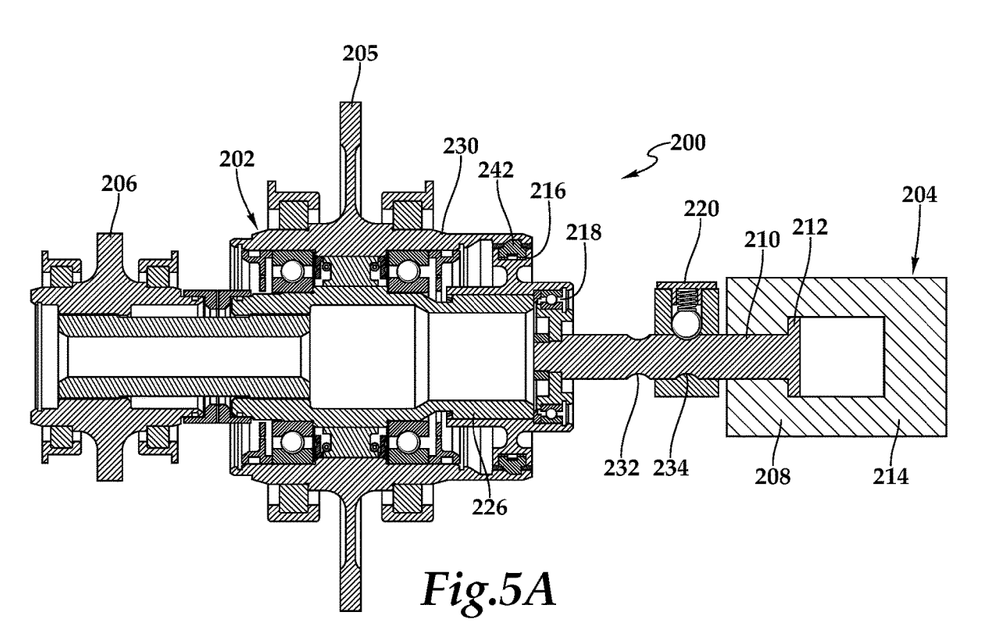
FIGS. 5A-5B are schematic illustrations of a selectable clutch assembly having a ratchet assembly in accordance with embodiments of the present disclosure.
Figure 5B:
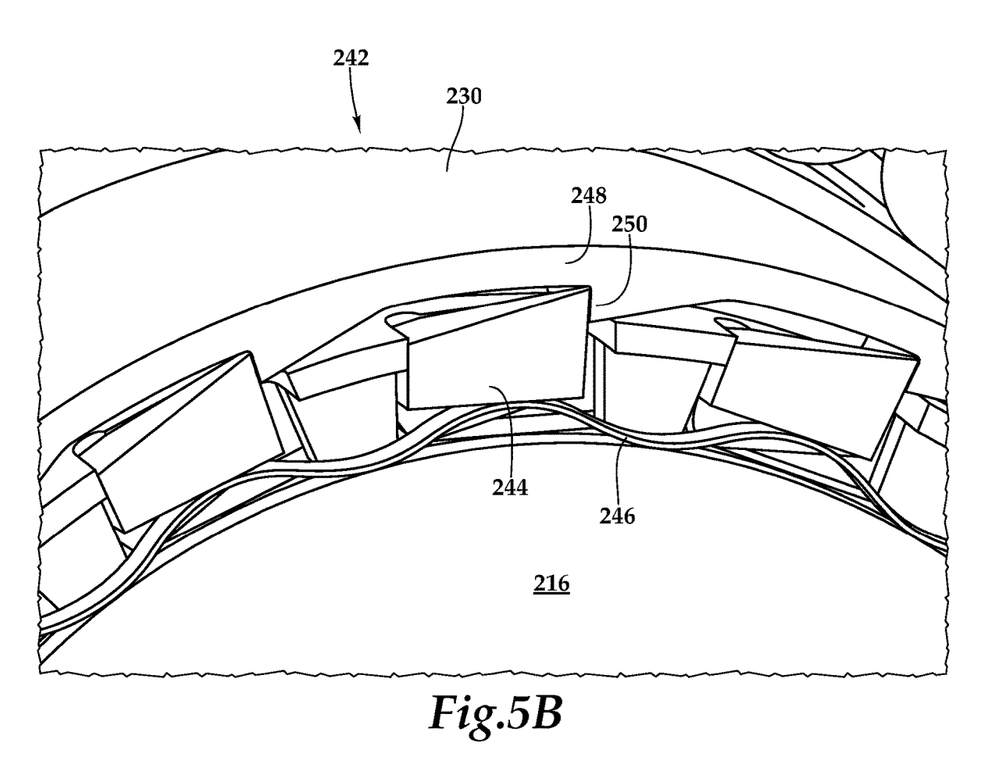

Referring to FIGS. 5A-5B in the drawings, selectable clutch assembly 200 is shown with a ratchet assembly 242 for coupling bypass coupling 216 with outer race 230. Instead of using wave spring 222 to aid in the alignment outer splines 238 of bypass coupling 216 and inner splines 228 of outer race 230 during the engagement sequence, in the illustrated embodiment, bypass coupling 216 including a plurality spring mounted keys 244 the are radially outwardly biased by one or more spring elements depicted as annular spring 246. As bypass coupling 216 approaches and contacts outer race 230 during the engagement sequence, mating profile 248 of outer race 230 compresses spring mounted keys 244 and rotates relative thereto as required to receive spring mounted keys 244 against shoulders 250 of mating profile 248.

Figure 6A:
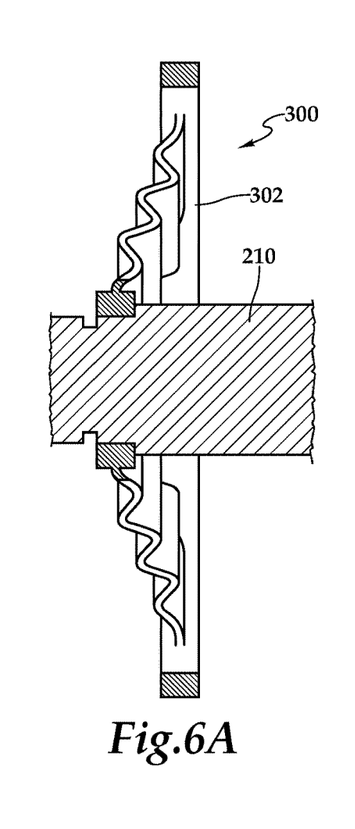
FIGS. 6A-6D are schematic illustrations of an alternate lock assembly for securing a selectable clutch assembly in the disengaged position and the engaged position in accordance with embodiments of the present disclosure.
Figure 6B:
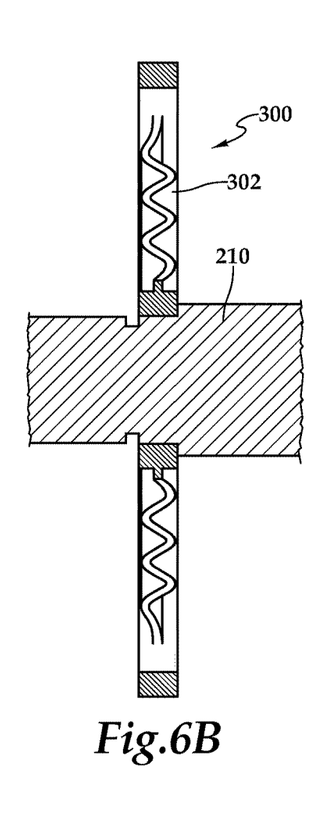
Figure 6C:
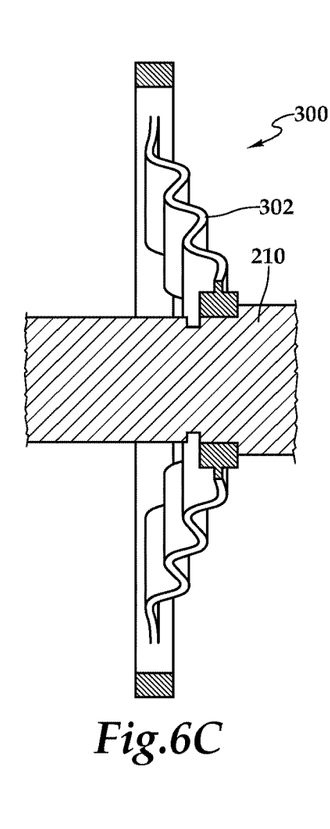
Figure 6D:
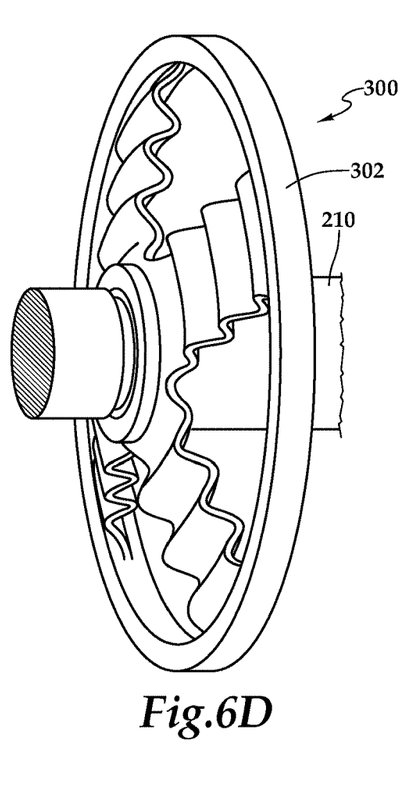

Referring to FIGS. 6A-6D in the drawings, an alternate embodiment of a mechanical locking assembly for a selectable clutch assembly is schematically illustrated and generally designated 300. Locking spring assembly 300 is coupled to actuation shaft 210 and has a first relaxed position as depicted in FIGS. 6A and 6D and a second relaxed position as depicted in FIG. 6C. The first relaxed position may represent the locked position of actuation shaft 210 when bypass assembly 204 is in the engaged position and selectable clutch assembly 200 is in the bidirectional torque transfer mode. Likewise, the second relaxed position may represent the locked position of actuation shaft 210 when bypass assembly 204 is in the disengaged position and selectable clutch assembly 200 is in the unidirectional torque transfer mode. Locking spring assembly 300 maintains these locked positions as energy is require to compress the spring elements of diaphragm 302, as best seen in FIG. 6B, to shift actuation shaft 210 between its first and second positions.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A multimode powertrain for a rotorcraft, the multimode powertrain comprising:
a main drive system including a main engine, a main rotor gearbox coupled to the main engine and a tail rotor gearbox coupled to the main rotor gearbox;
a secondary drive system including a secondary engine; and
a selectable clutch assembly positioned between the main and the secondary drive systems, the selectable clutch assembly including:
a freewheeling unit having an input side coupled to the main drive system and an output side coupled to the secondary drive system, the freewheeling unit having a driving mode wherein torque applied to the input side is transferred to the output side and an over running mode wherein torque applied to the output side is not transferred to the input side; and
a bypass assembly coupled to the output side of the freewheeling unit and rotatable therewith, the bypass assembly actuatable between an engaged position and a disengaged position with the input side of the freewheeling unit;
wherein, in the disengaged position of the bypass assembly, the freewheeling unit is operable in the driving mode and the over running mode such that the selectable clutch assembly is configured for unidirectional torque transfer from the input side to the output side;
wherein, in the engaged position of the bypass assembly, the over running mode of the freewheeling unit is disabled such that the selectable clutch assembly is configured for bidirectional torque transfer from the input side to the output side and from the output side to the input side; and
wherein, in a high efficiency configuration, the selectable clutch assembly is in the engaged position, the secondary engine is not operating, the main engine provides power to the main rotor gearbox, the tail rotor gearbox and the secondary drive system through the selectable clutch assembly to power at least one rotorcraft accessory coupled to the secondary drive system.

2. The multimode powertrain as recited in claim 1 wherein the bypass assembly further comprises an actuator configured to shift the bypass assembly between the engaged position and the disengaged position.

3. The multimode powertrain as recited in claim 1 wherein, in a preflight configuration, the selectable clutch assembly is in the disengaged position, the main engine is not operating and the secondary engine provides power to at least one rotorcraft accessory coupled to the secondary drive system.

4. The multimode powertrain as recited in claim 1 wherein, in an enhanced power configuration, the selectable clutch assembly is in the engaged position, the main engine provides power to the main rotor gearbox and the tail rotor gearbox and the secondary engine provides power to at least one rotorcraft accessory coupled to the secondary drive system and to the main drive system through the selectable clutch assembly.

5. The multimode powertrain as recited in claim 1 wherein the bypass assembly further comprises a locking assembly configured to maintain the bypass assembly in the engaged position and in the disengaged position.

6. The multimode powertrain as recited in claim 1 wherein, in an enhanced autorotation configuration, the selectable clutch assembly is in the engaged position, the main engine is not operating and the secondary engine provides power to the main drive system through the selectable clutch assembly including to the main rotor gearbox.

7. The multimode powertrain as recited in claim 1 wherein the secondary engine is configured to generate between about 5 percent and about 20 percent of the power of the main engine.

8. The multimode powertrain as recited in claim 1 wherein the secondary engine is configured to generate between about 10 percent and about 15 percent of the power of the main engine.

9. A rotorcraft comprising:
a main drive system including a main engine, a main rotor gearbox coupled to the main engine and a tail rotor gearbox coupled to the main rotor gearbox;
a main rotor coupled to the main rotor gearbox and rotatable thereby;
a tail rotor coupled to the tail rotor gearbox and rotatable thereby;
a secondary drive system including a secondary engine; and a selectable clutch assembly positioned between the main and the secondary drive systems, the selectable clutch assembly including:
a freewheeling unit having an input side coupled to the main drive system and an output side coupled to the secondary drive system, the freewheeling unit having a driving mode wherein torque applied to the input side is transferred to the output side and an over running mode wherein torque applied to the output side is not transferred to the input side; and
a bypass assembly coupled to the output side of the freewheeling unit and rotatable therewith, the bypass assembly actuatable between an engaged position and a disengaged position with the input side of the freewheeling unit;
wherein, in the disengaged position of the bypass assembly, the freewheeling unit is operable in the driving mode and the over running mode such that the selectable clutch assembly is configured for unidirectional torque transfer from the input side to the output side;
wherein, in the engaged position of the bypass assembly, the over running mode of the freewheeling unit is disabled such that the selectable clutch assembly is configured for bidirectional torque transfer from the input side to the output side and from the output side to the input side; and
wherein, in an enhanced autorotation configuration, the selectable clutch assembly is in the engaged position, the main engine is not operating and the secondary engine provides power to the main drive system through the selectable clutch assembly including to the main rotor gearbox.

10. The rotorcraft as recited in claim 9 wherein, in a preflight configuration, the selectable clutch assembly is in the disengaged position, the main engine is not operating and the secondary engine provides power to at least one rotorcraft accessory coupled to the secondary drive system.

11. The rotorcraft as recited in claim 9 wherein, in an enhanced power configuration, the selectable clutch assembly is in the engaged position, the main engine provides power to the main rotor gearbox and the tail rotor gearbox and the secondary engine provides power to at least one rotorcraft accessory coupled to the secondary drive system and to the main drive system through the selectable clutch assembly.

12. The rotorcraft as recited in claim 9 wherein, in a high efficiency configuration, the selectable clutch assembly is in the engaged position, the secondary engine is not operating, the main engine provides power to the main rotor gearbox, the tail rotor gearbox and the secondary drive system through the selectable clutch assembly to power at least one rotorcraft accessory coupled to the secondary drive system.

13. The rotorcraft as recited in claim 9 wherein the bypass assembly further comprises a locking assembly configured to maintain the bypass assembly in the engaged position and in the disengaged position.

14. A multimode powertrain for a rotorcraft, the multimode powertrain comprising:
a main drive system including a main engine, a main rotor gearbox coupled to the main engine and a tail rotor gearbox coupled to the main rotor gearbox;
a secondary drive system including a secondary engine; and
a selectable clutch assembly positioned between the main and the secondary drive systems, the selectable clutch assembly including:
a freewheeling unit having an input side coupled to the main drive system and an output side coupled to the secondary drive system, the freewheeling unit having a driving mode wherein torque applied to the input side is transferred to the output side and an over running mode wherein torque applied to the output side is not transferred to the input side; and
a bypass assembly coupled to the output side of the freewheeling unit and rotatable therewith, the bypass assembly actuatable between an engaged position and a disengaged position with the input side of the freewheeling unit;
wherein, in the disengaged position of the bypass assembly, the freewheeling unit is operable in the driving mode and the over running mode such that the selectable clutch assembly is configured for unidirectional torque transfer from the input side to the output side;
wherein, in the engaged position of the bypass assembly, the over running mode of the freewheeling unit is disabled such that the selectable clutch assembly is configured for bidirectional torque transfer from the input side to the output side and from the output side to the input side; and
wherein, in an enhanced autorotation configuration, the selectable clutch assembly is in the engaged position, the main engine is not operating and the secondary engine provides power to the main drive system through the selectable clutch assembly including to the main rotor gearbox.

15. The multimode powertrain as recited in claim 14 wherein the bypass assembly further comprises an actuator configured to shift the bypass assembly between the engaged position and the disengaged position.

16. The multimode powertrain as recited in claim 14 wherein the bypass assembly further comprises a locking assembly configured to maintain the bypass assembly in the engaged position and in the disengaged position.

17. The multimode powertrain as recited in claim 14 wherein, in a preflight configuration, the selectable clutch assembly is in the disengaged position, the main engine is not operating and the secondary engine provides power to at least one rotorcraft accessory coupled to the secondary drive system.

18. The multimode powertrain as recited in claim 14 wherein, in an enhanced power configuration, the selectable clutch assembly is in the engaged position, the main engine provides power to the main rotor gearbox and the tail rotor gearbox and the secondary engine provides power to at least one rotorcraft accessory coupled to the secondary drive system and to the main drive system through the selectable clutch assembly.

19. The multimode powertrain as recited in claim 14 wherein the secondary engine is configured to generate between about 5 percent and about 20 percent of the power of the main engine.

20. The multimode powertrain as recited in claim 14 wherein the secondary engine is configured to generate between about 10 percent and about 15 percent of the power of the main engine.

* * * * *